(12) United States Patent  
Bookbinder et al.

(10) Patent No.: US 10,094,975 B2  
(45) Date of Patent: Oct. 9, 2018

(54) LOW LOSS SINGLE MODE FIBER WITH CHLORINE DOPED CORE

(71) Applicant: Corning Incorporated, Corning, NY (US)

(72) Inventors: Dana Craig Bookbinder, Corning, NY (US); Ming-Jun Li, Horseheads, NY (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/659,955

(22) Filed: Jul. 26, 2017

(65) Prior Publication Data

US 2018/0031761 A1    Feb. 1, 2018

Related U.S. Application Data

(60) Provisional application No. 62/368,703, filed on Jul. 29, 2016.

(51) Int. Cl.
*G02B 6/02* (2006.01)
*G02B 6/028* (2006.01)
(Continued)

(52) U.S. Cl.
CPC ..... *G02B 6/02276* (2013.01); *G02B 6/02009* (2013.01); *G02B 6/0286* (2013.01);
(Continued)

(58) Field of Classification Search
CPC ............ G02B 6/02276; G02B 6/03655; G02B 6/03633; G02B 6/036927; G02B 6/02009;
(Continued)

(56) References Cited

U.S. PATENT DOCUMENTS

| 7,088,900 B1 | 8/2006 | Mishra |
| 7,929,818 B1 * | 4/2011 | Bickham ............ G02B 6/02019 385/124 |

(Continued)

OTHER PUBLICATIONS

International Search Report and Written Opinion PCT/US2017/043011 dated Oct. 12, 2017.

(Continued)

*Primary Examiner* — Ryan Lepisto
(74) *Attorney, Agent, or Firm* — Svetlana Z. Short

(57) ABSTRACT

An optical fiber comprising: (i) a chlorine doped silica based core comprising a core alpha ($\alpha$)>10, and maximum refractive index delta $\Delta_{1max}$ % and Cl concentration >1 wt %; (ii) a cladding surrounding the core, the cladding comprising: (a) an inner cladding region adjacent to and in contact with the core and having a refractive index delta $\Delta_2$ and a minimum refractive index delta $\Delta_{2min}$ such that $\Delta_{2min}<\Delta_{1max}$, the inner cladding region comprising fluorine doped silica and the refractive index delta $\Delta_2$ with region that decreases with radial position, and (b) an outer cladding region surrounding the inner cladding region and having refractive index delta $\Delta_3$, such that $\Delta_{2min}<\Delta_3$. The fiber has mode field diameter MFD at 1310 nm of ≥9 microns, a cable cutoff of ≤1260 nm, zero dispersion wavelength of 1300 nm≤zero dispersion wavelength ≤1324 nm and bend loss at 1550 nm for a 20 mm mandrel of less than 0.5 dB/turn.

23 Claims, 7 Drawing Sheets

(51) Int. Cl.
*G02B 6/036* (2006.01)
*G02B 6/44* (2006.01)

(52) U.S. Cl.
CPC ..... *G02B 6/03616* (2013.01); *G02B 6/03627* (2013.01); *G02B 6/03633* (2013.01); *G02B 6/03655* (2013.01); *G02B 6/4478* (2013.01)

(58) Field of Classification Search
CPC . G02B 6/4478; G02B 6/03616; G02B 6/0286
See application file for complete search history.

(56) References Cited

U.S. PATENT DOCUMENTS

| | | |
|---|---|---|
| 8,891,925 B2 | 11/2014 | Bickham et al. |
| 8,953,917 B2 | 2/2015 | Berkey et al. |
| 9,057,817 B2 | 6/2015 | Bookbinder et al. |
| 9,580,350 B2 | 2/2017 | Annamalai et al. |
| 9,618,592 B2 | 4/2017 | Berkey et al. |
| 9,618,692 B2 * | 4/2017 | Berkey .............. G02B 6/02014 |
| 9,658,395 B2 | 5/2017 | Borel et al. |
| 2004/0240814 A1 | 12/2004 | Boek et al. |
| 2008/0285929 A1 | 11/2008 | Shimotakahara |
| 2015/0293300 A1 | 10/2015 | Fini et al. |
| 2016/0011365 A1 | 1/2016 | Berkey et al. |
| 2016/0131832 A1 | 5/2016 | Haruna et al. |

OTHER PUBLICATIONS

International Search Report and Written Opinion PCT/US2017/044155 dated Oct. 17, 2017.

* cited by examiner

200
LOW LOSS SINGLE MODE FIBER WITH CHLORINE DOPED CORE

This application claims the benefit of priority under 35 U.S.C. § 119 of U.S. Provisional Application Ser. No. 62/368,703, filed on Jul. 29, 2016, the content of which is relied upon and incorporated herein by reference in its entirety.

BACKGROUND

The disclosure relates generally to single mode fibers with chlorine doped cores, and more particularly to single mode fibers with chlorine doped cores and a cladding having a fluorine doped trench region.

No admission is made that any reference cited herein constitutes prior art. Applicant expressly reserves the right to challenge the accuracy and pertinence of any cited documents.

SUMMARY

One embodiment of the disclosure relates to an optical fiber that comprises:
(i) a chlorine doped silica based core comprising a core alpha ($\alpha_{core}$)>10, maximum refractive index delta $\Delta_{1max}$ %, and Cl concentration >1 wt %;
(ii) a cladding surrounding the core, the cladding comprising:
  a. an inner cladding region comprising fluorine doped silica, adjacent to and in contact with the core and having a refractive index delta $\Delta_2$ and a minimum refractive index delta $\Delta_{2min}$ such that $\Delta_{2min} < \Delta_{1max}$, and the refractive index delta $\Delta_2$ of the inner cladding region comprising a region that decreases with radial position, and
  b. an outer cladding region surrounding the inner cladding region and having refractive index delta $\Delta_3$, such that $\Delta_{2min} < \Delta_3$;
wherein the optical fiber has mode field diameter MFD at 1310 nm of ≥9 microns, a cable cutoff of ≤1260 nm, zero dispersion wavelength such that 1300 nm≤zero dispersion wavelength ≤1324 nm, and bend loss at 1550 nm for a 20 mm mandrel of less than 0.5 dB/turn.

According to some embodiments, the core alpha is at least 20. According to some embodiments, the core alpha is at least 50. According to some embodiments, the core alpha is at least 100.

According to some embodiments, the refractive index delta $\Delta_2$ of the inner cladding region monotonically decreases radially, towards the outer cladding region. According to some embodiments the inner cladding region has a maximum refractive index delta $\Delta_{2max}$, and $\Delta_3$ is <$\Delta_{2max}$. According to some embodiments, the inner cladding has a Trench Slope TS=($\Delta_{2max}-\Delta_{2min}$)/($r_2-r_1$), such that 0.005% $\Delta$/micron<TS<0.2% $\Delta$/micron. According to some embodiments, the inner cladding has an alpha value $\alpha_T$, and 0.2<$\Delta_T$<5.

According to some embodiments, the core has chlorine concentration of greater than 1.2 wt %, for example greater than 1.5 wt %, greater than 1.8 wt %, greater than 2 wt %, greater than 2.5 wt %, and in some embodiments greater than 3 wt %. According to some embodiments, the core has chlorine concentration of between 1.2 and 4 wt %.

According to some embodiments, the fiber exhibits bend loss at 1550 nm for a 20 mm mandrel is less than 0.3 dB/turn and/or MFD at 1310 nm is between 9 microns and 9.6 microns. According to some embodiments, the fiber exhibits bend loss at 1550 nm for a 20 mm mandrel of 0.19 dB/turn to 0.29 dB/turn.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1A:
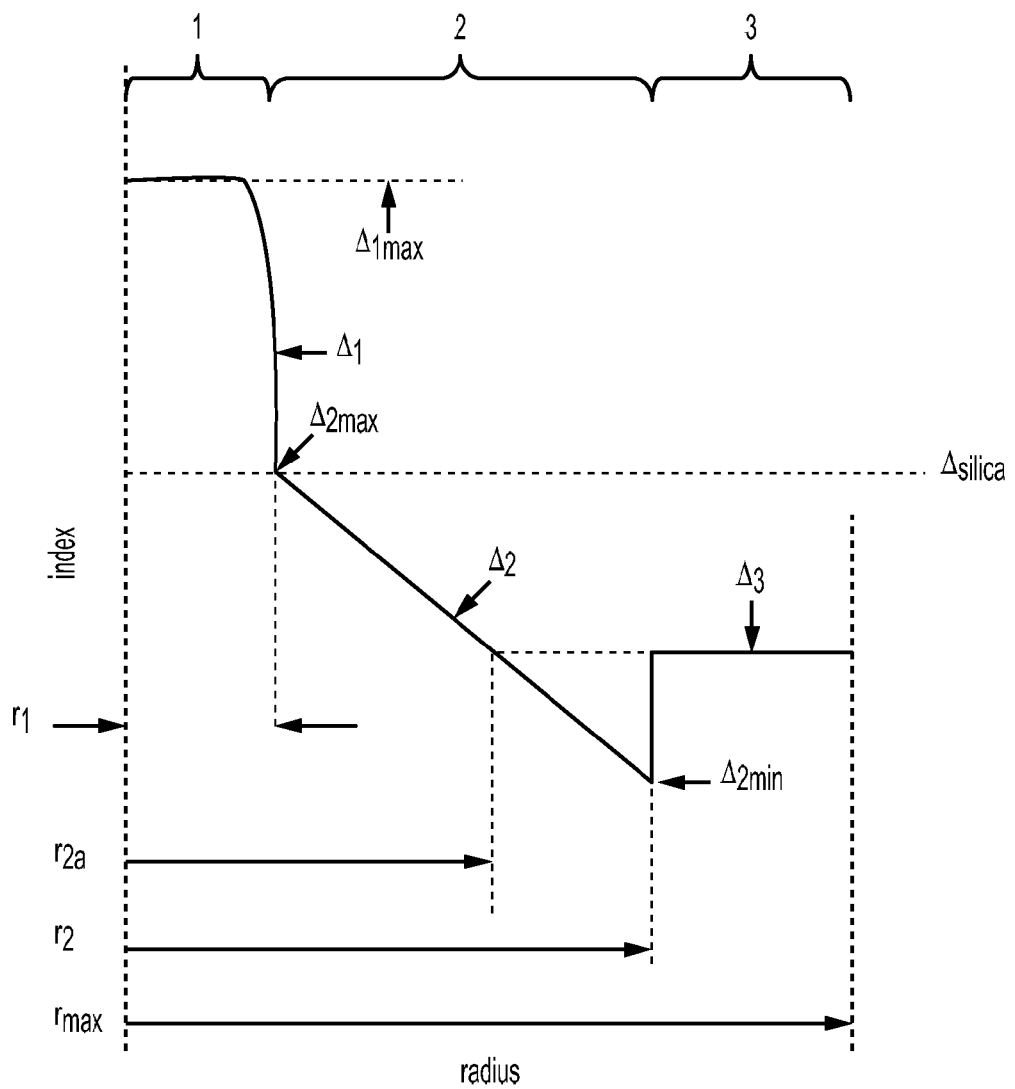
FIG. 1A is a schematic illustration of a refractive index profile corresponding to an embodiment of an optical fiber as disclosed herein.

Additional features and advantages will be set forth in the detailed description which follows and will be apparent to those skilled in the art from the description or recognized by practicing as described in the following description together with the claims and appended drawings.

Low attenuation is one of the most critical properties in optical fibers. Optical fibers disclosed herein are valuable for use as low attenuation optical fibers in optical fiber cables for submarine and terrestrial long haul systems.

The "refractive index profile" is the relationship between refractive index or relative refractive index (also referred to as refractive index delta herein) and waveguide fiber radius. The radius for each segment of the refractive index profile is given by the abbreviations $r_1$, $r_2$, $r_3$, $r_4$, etc. and lower an upper case are used interchangeability herein (e.g., $r_1$ is equivalent to $R_1$).

Unless stated otherwise, the "relative refractive index percent" is defined as $\Delta \% = 100 \times (n_i^2 - n_c^2)/2n_i^2$, and as used herein $n_c$ is the average refractive index of undoped silica glass. As used herein, the relative refractive index is represented by $\Delta$ and its values are given in units of "%", unless otherwise specified. The terms: relative refractive index percent, relative refractive index, refractive index delta, relative refractive index delta, delta, $\Delta$, $\Delta$ %, % $\Delta$, delta %, % delta and percent delta may be used interchangeably herein. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine and $B_2O_3$. As described herein, while the relative refractive index of the optical profiles are calculated where index of $n_c$ is undoped silica, the entire index profile of the optical fiber can be shifted linearly up (or down) in order to obtain equivalent optical fiber properties.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined in equation 1 as:

$$A_{eff}=2\pi(\int f^2 r dr)^2/(\int f^4 r dr) \qquad \text{Eq. 1}$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-core profile", refers to a relative refractive index profile of the core, expressed in terms of $\Delta(r)$ which is in units of "%", where r is radius, which follows the equation (Eq. 2), $$\Delta(r)=\Delta(r_o)(1-[|r-r_o|/(r_1-r_o)]^{\alpha_{core}}) \qquad \text{Eq. 2}$$

where $r_o$ is the point at which $\Delta(r)$ is maximum and is the initial point of the α-core profile, $r_1$ is the outer radius of the core and corresponds to the final point of the core's α-profile, it is defined as where a tangent line drawn through maximum slope of the refractive index of core crosses the zero delta line (i.e., the point at which $\Delta(r)$ % is zero), and r is in the range $r_i \leq r \leq r_f$, where $\Delta$ is defined above, $r_o$ corresponds to the initial point of the core's α-profile, $r_1$ corresponds to the final point of the α-profile, and $\alpha_{core}$ (also referred to herein as "core alpha") is an exponent which is a real number (also referred to as a core alpha herein). In the discussion below, example values of $\alpha_{core}$ are provided for at least some of the embodiments described herein).

The term "α-profile of the inner cladding", also referred herein as the alpha$_{trench}$ or $\alpha_T$, refers to a relative refractive index profile of the inner cladding region, expressed in terms of $\Delta(r)$ which is in units of "%", where r is radius, which follows the equation (Eq. 3), $$\Delta(r)=\Delta(r_2)+(\Delta(r_1)-\Delta(r_2))(1-[|r-r_1|/(r_2-r_1)]^{\alpha_T}) \qquad \text{Eq. 3}$$

where $r_1$ is defined as above, and is typically the point at which $\Delta(r)$ of the inner cladding refion is maximum, $r_2$ is the outer radius of the inner cladding and corresponds to a point at which a (vertical) line drawn through refractive index profile of inner cladding associated with its minimum refractive index crosses the zero delta line (i.e., the point at which $\Delta(r)$ % is zero), and r is in the range $r_i \leq r \leq r_f$, where $\Delta$ is defined above, $r_i$ is the initial point of the α-profile of the inner clading region, $r_f$ is the final point of the a-profile of the inner clading region, and $\alpha_T$ is an exponent which is a real number (also referred to as a inner cladding alpha herein).

The term "trench" as used herein, refers to a cladding region that has a minimum refractive index that is lower than that of the adjacent regions that are in contact therewith. The trench volume $V_T$ is defined herein in equation 4 as $$V_T = 2\int_{r_{2a}}^{r_3} \Delta_{3-2}(r) r dr \qquad \text{Eq. 4}$$

wherein $\Delta_{3-2}(r)$ is $\Delta_3-\Delta_2(r)$ for a given radial position r situated between the radial positions of $r_{2a}$ and $r_2$, and wherein $r_{2a}$ is the radial position where the refractive index in inner cladding region, moving radially outward from centerline, is first equal to the refractive index of the outer cladding region—i.e., where $\Delta r_{2a}=\Delta_3$ (see, for example, FIGS. 1A-AC, 2 and 3).

The mode field diameter (MFD) is measured using the Peterman II method wherein, 2w=MFD, and $w^2=(2\int f^2 r \, dr/\int[df/dr]^2 r \, dr)$, the integral limits being 0 to ∞.

The terms "μm" and "microns" can be used interchangeably herein.

The bend resistance of a waveguide fiber can be gauged by induced attenuation under prescribed test conditions, for example by deploying or wrapping the fiber around a mandrel of a prescribed diameter, e.g., by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation per turn.

One type of bend test is the lateral load microbend test. In this so-called "lateral load" test (LLWM), a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200 nm-1700 nm, e.g., 1310 nm or 1550 nm or 1625 nm).

Another type of bend test is the wire mesh covered drum microbend test (WMCD). In this test, a 400 mm diameter aluminum drum is wrapped with wire mesh. The mesh is wrapped tightly without stretching, and should have no holes, dips, or damage. Wire mesh material specification: McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area %: 44.0. A prescribed length (750 meters) of waveguide fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the waveguide in dB/km at a specified wavelength (typically within the range of 1200-1700 nm, e.g., 1310 nm or 1550 nm or 1625 nm).

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2m fiber cutoff test, FOTP-80 (EIA-TIA-455-80), to yield the "fiber cutoff wavelength", also known as the "2m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

Unless otherwise noted herein, optical properties (such as dispersion, dispersion slope, etc.) are reported for the LP01 mode.

According to some embodiments, an optical fiber includes:
(i) a chlorine doped silica based core having a core alpha (α)>10 and maximum refractive index delta $\Delta_{1max}$ %;
(ii) a cladding surrounding the core, the cladding comprising:
   a. an inner cladding region adjacent to and in contact with the core and having a refractive index delta $\Delta_2$ and a minimum refractive index delta $\Delta_{2min}$ such that $\Delta_{2min}<\Delta_{1max}$, the inner cladding region being doped with fluorine (F), and the refractive index delta $\Delta_2$ of the inner cladding region decreases with radial position; and
   b. an outer cladding region surrounding the inner cladding region and having refractive index delta $\Delta_3$, such that $\Delta_{2min}<\Delta_3$;
wherein the optical fiber has mode field diameter MFD at 1310 nm of larger than 9 microns, a cable cutoff of less than 1260 nm, zero dispersion wavelength between about 1300 nm and about 1324 nm and bend loss at 1550 nm for a 20 mm mandrel of less than 0.5 dB/turn.

According to some embodiments, the core comprises silica glass, preferably with greater than 1 wt % chlorine, and more preferably with greater than 1.2 wt % chlorine. In some embodiments the core comprises geater than 1.5 wt % chlorine and less than 0.5 wt % fluorine.

According to some embodiments, the core alpha is at least 20 (for example, α≥50; or α≥70; or α≥80; or α≥100). According to at least some embodiments, refractive index delta $\Delta_2$ of the inner cladding region monotonically decreases towards the outer cladding region (i.e., it decreases as the radial distance from the fiber center line increases). That is, in some embodiments $\Delta_2$ of the inner cladding region becomes monotonically more negative as the radius r within this region becomes larger.

Figure 4:
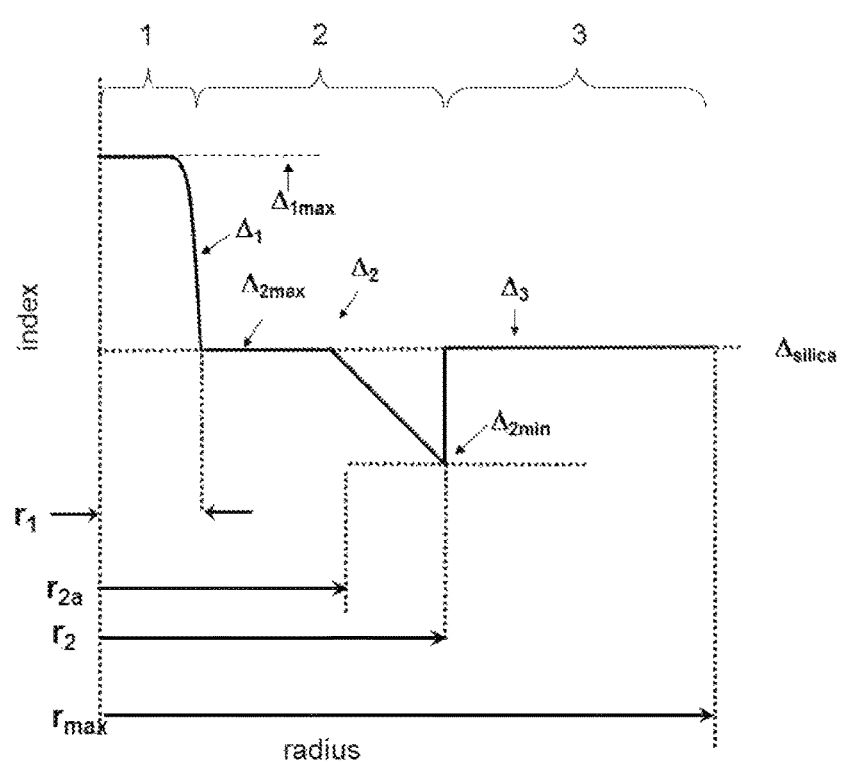
FIG. 4 illustrates of a refractive index delta profile corresponding to another embodiment of an optical fiber.
Figure 5:
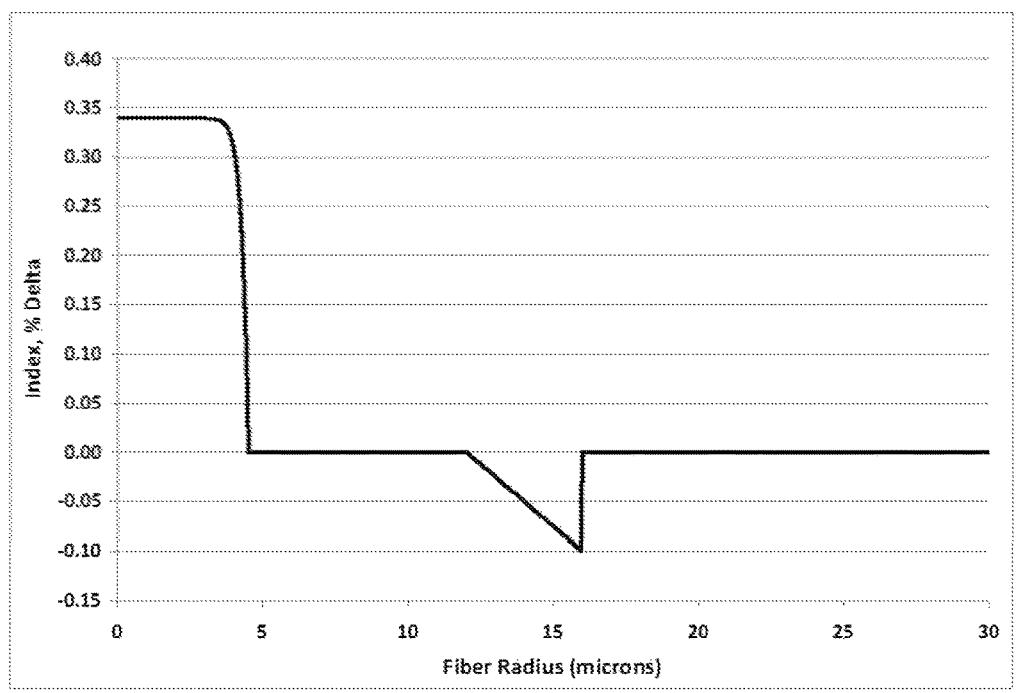
FIG. 5 illustrates of a refractive index delta profile corresponding to another embodiment of an optical fiber.

According to some embodiments, the optical fiber comprises an inner cladding region having a refractive index delta $\Delta_2$, wherein the refractive index delta $\Delta_2$ of the portion of the inner cladding region that decreases with radial position is offset from the core (i.e., the inner cladding region is not in direct contact with the core, but is separated from the core by an offset region). One embodiment of this optical fiber is shown in FIGS. 4 and 5, and corresponds to example 16 fiber. According to some embodiments, the offset (e.g., in this embodiment offset is the distance between $r_1$ and $r_{2a}$, i.e., offset=$r_{2a}-r_1$) is 1 micron≤offset≤15 microns. According to some embodiments, the offset is 2 micron≤offset≤12 microns. According to some embodiments, the offset is 3 micron≤offset≤10 microns.

According to at least some embodiments the fiber core has an outer radius $r_1$ and 3.0 μm≤$r_1$≤5.0 μm. For example, in some embodiments, 3 μm≤$r_1$≤4 μm, 3 μm≤$r_1$≤4.5 μm, or 3.3 μm≤$r_1$≤4.5 μm.

According to at least some embodiments inner cladding region has a maximum refractive index delta $\Delta_{2max}$ such that the refractive index delta of the outer cladding is smaller than $\Delta_{2max}$ (i.e., $\Delta_3$ is <$\Delta_{2max}$).

According to at least some embodiments, 0.1%≤$\Delta_{1max}$≤0.35%, and 0.35%≤$\Delta_{2min}$<0%. According to at least some embodiments the core has an outer radius $r_1$ wherein 3 μm≤$r_1$≤4 μm; the inner cladding region has an outer radius $r_2$ and 6.5 μm≤$r_2$≤20 μm and −0.35%≤$\Delta_{2min}$<0%. In at least some embodiments $\Delta_3$−$\Delta_{2min}$ is 0.03% to 0.9%, for example between 0.03% and 0.85% (e.g. 0.4%, 0.5%, 0.6%, 0.7%, 0.8%, 0.85%, or therebetween).

The inner cladding region 2 is sandwiched between two regions—i.e., it is sandwiched between the core 1 and the outer cladding region 3. The inner cladding region 2 has a minimum refractive index delta $\Delta_{2min}$ that is lower than that of the core and that of the outer cladding region 3. That is, $\Delta_{2min}$ is smaller than the minimum refractive index deltas of the core 1 and of the outer cladding region 3. Thus, in the exemplary embodiments of FIGS. 1A, 1B, 1C, 2 and 3 the inner cladding region 2 is a trench because $\Delta_{2min}$ is smaller the minimum refractive index of the core 1 (which occurs at r=$r_1$), and also smaller than the minimum refractive index delta of outer cladding 3. In the exemplary embodiments described herein the refractive index delta of the outer cladding is nearly constant, i.e, $\Delta_3 \approx \Delta_{3min}$, thus $\Delta_{2min}<\Delta_3$, and $\Delta_{2min}<\Delta_1(r_1)$.

According to some embodiments, the inner cladding 2 has a trench volume $V_T$, and 3% Δmicron$^2$≤$V_T$≤12% Δmicron$^2$. (Please note that the trench volume $V_T$ is defined by equation 4.)

In some embodiments the inner cladding region 2 has a maximum refractive index delta $\Delta_{2max}$, and 0.03≤($\Delta_{2max}$−$\Delta_{2min}$)≤0.6. In some embodiments 0.03≤($\Delta_{2max}$−$\Delta_{2min}$)≤0.4.

In some embodiments $0.03 \leq (\Delta_{2max} - \Delta_{2min}) \leq 0.3$. The inner cladding has an outer radius $r_2$. In at least some embodiments $2 \leq (r_2 - r_1) \leq 15$, in some embodiments $3 \leq (r_2 - r_1) \leq 13.5$, in some embodiments $3 \leq (r_2 - r_1) \leq 10$, and in some embodiments $3 \leq (r_2 - r_1) \leq 8.5$. In some embodiments, optical fibers disclosed herein are single moded at 1550 nm exhibiting an effective area, $A_{eff}$, at 1550 nm which is greater than about 60 microns$^2$, in some embodiments 60 microns$^2 \leq A_{eff} \leq 100$ microns$^2$, in some embodiments 75 microns$^2 \leq A_{eff} \leq 90$.

An exemplary fiber 10, as shown in FIGS. 1A, 1B, 1C, 2 and 3, includes a glass core 1 comprising maximum refractive index delta percent $\Delta_{1max}$, A depressed inner cladding region 2 surrounds core 1, the inner cladding region 2 comprising refractive index delta percent $\Delta_{2min}$, where $\Delta_{1max} > \Delta_{2min}$. Inner cladding region 2 is preferably immediately adjacent to glass core 1. Glass core 1 comprises silica glass, preferably with greater than 1.5 wt % chlorine and less than 0.5 wt % fluorine. Because GeO$_2$ has higher Rayleigh scattering than silica, in some embodiments glass core 1 comprises less than 1 weight percent GeO$_2$, in some embodiments less than 0.5 wt % GeO$_2$, in some embodiments less than 0.2 wt % Ge, and in some embodiments contains no GeO$_2$. In some embodiments, the core 1 comprises silica glass doped with greater than 2 wt % chlorine. In some other embodiments, the core 1 comprises silica glass doped with greater than 2.5 wt % chlorine. In some other embodiments, the core 1 comprises silica glass doped with greater than 3 wt % chlorine. In still other embodiments, the core 1 comprises silica glass doped with greater than 2.5 wt % chlorine and is preferably essentially free of fluorine. Inner cladding region 2 comprises silica doped with fluorine. The term Cl$_{core}$ represents the maximum amount of chlorine dopant amount (mole %) in the core 1, and the term F$_{inner\ clad}$ represents the maximum amount of fluorine dopant amount (mole %) in the inner cladding region 2. In some embodiments the weight ratio (WR) of chlorine in the core region 1 to fluorine in inner cladding region 2 (i.e., Cl$_{core}$/F$_{inner\ clad}$) is preferably greater than 1, in some embodiments greater than 1.5, in some embodiments greater than 2, in some embodiments greater than 2.5, and in some embodiments greater than 3.0. In some embodiments the weight ratio (WR) of chlorine in the core region 1 to fluorine in inner cladding region 2 (i.e., Cl$_{core}$/F$_{inner\ clad}$) is between 1 and 25, for example between 1.5 and 23. In some embodiments, $1.5 \leq WR \leq 15$ (for example WR of 1.6, 1.75, 2, 2.25, 3, 3.3, 3.5, 4, 5, 7, 8, 10, 11, 12, or there between).

In some embodiments core 1 may comprise greater than 1.5 wt % chlorine and less than 0.6 wt % fluorine, in other embodiments greater than 2.0 wt % chlorine in other embodiments greater than 2.5 wt % chlorine, and in other embodiments greater than 3.0 wt % chlorine. Core 1 may comprise less than 0.5 wt % fluorine, in some embodiments less than 0.25 wt % fluorine. In some embodiments, core 1 is essentially free of fluorine.

Core 1 has a maximum refractive index delta percent, $\Delta_{1max}$, between about 0.1% $\Delta$ to about 0.5% $\Delta$, and in some embodiments between about 0.12% $\Delta$ to 0.4% $\Delta$, and in other embodiments between about 0.15% $\Delta$ to 0.35% $\Delta$. In at least some embodiments the core radius $r_1$ is between 3 and 5 microns, and in some embodiments between about 3 to 4 microns. Core 1 may comprise a single segment, step index profile. As discussed above, in some embodiments, core 1 exhibits an alpha $\alpha$ greater than 10 (for example $10 \leq \alpha \leq 200$, or $10 \leq \alpha \leq 100$, or $20 \leq \alpha \leq 100$, or $50 \leq \alpha \leq 100$, or $50 \leq \alpha \leq 500$). For example, in some embodiments the core alpha (i.e., $\alpha$) is greater than 20 and less than or equal to 200.

Figure 1B:
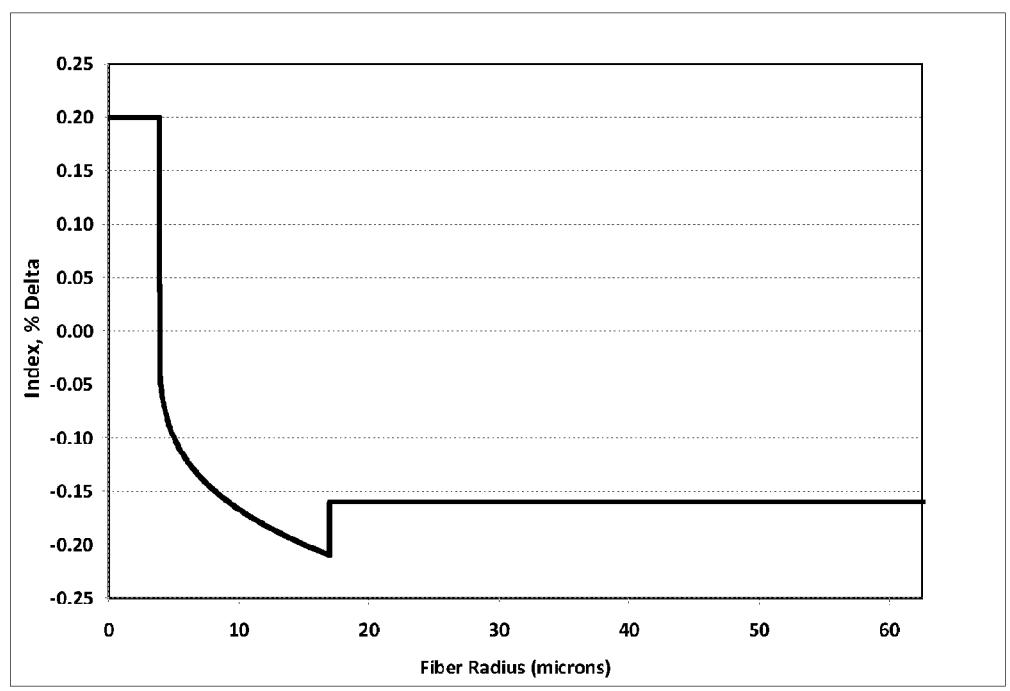
FIG. 1B illustrates of a refractive index profile corresponding to another embodiment of an optical fiber.
Figure 1C:
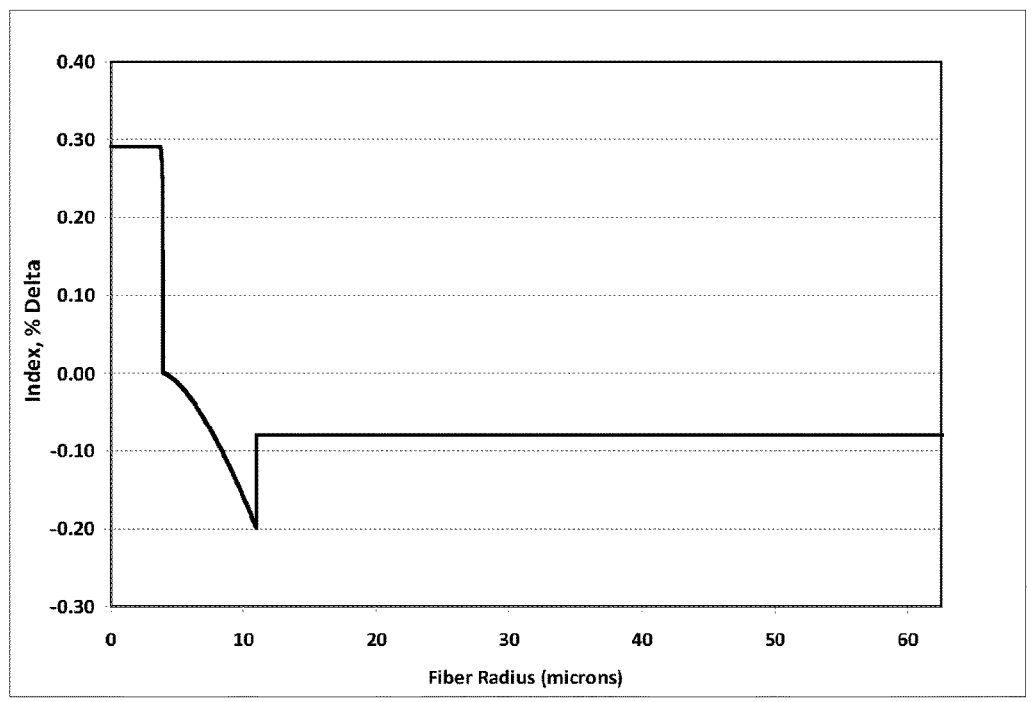
FIG. 1C illustrates of a refractive index delta profile corresponding to another embodiment of an optical fiber.

In the embodiment illustrated in FIGS. 1A, 1B and 1C, inner cladding region 2 surrounds core 1 and comprises inner radius $r_1$ and outer radius $r_2$, $r_1$ and $r_2$ being defined as the radius at $\Delta_{2min}$. Inner cladding region 2 may comprise greater than 0.15 wt % fluorine, in some embodiments $\geq 0.25$ wt % fluorine, in some embodiments $\geq 0.35$ wt % fluorine, and in some embodiments contains less than 2.3 weight percent fluorine, and in some embodiments $\geq 0.35$ wt % and $\leq 1$ wt % fluorine.

FIGS. 1A, 1B, 1C, 2 and 3 illustrate embodiments wherein the fiber comprises an outer cladding region 3 surrounding the inner cladding region 2, the outer cladding region 3 having average refractive index delta $\Delta_3$ wherein $\Delta_{1max} > \Delta_3 > \Delta_{2min}$. The outer cladding region 3 has a maximum refractive index delta $\Delta_{3max}$. (As described above, in the fiber embodiments corresponding to FIGS. 1A, 1B, 1C, 2 and 3 the refractive index delta of the outer cladding region 3 is essentially constant, thus in these exemplary embodiments $\Delta_3 \approx \Delta_{3max}$) In the embodiments of FIGS. 1A, 1B and 1C, the index of refraction of the outer cladding 3 is down-doped relative to the pure silica.

The inner cladding region 2 has a maximum relative refractive index $\Delta_{2max}$. The inner cladding region 2 has a refractive index delta slope (also referred to as a Trench Slope or TS herein) wherein TS=$(\Delta_{2max} - \Delta_{2min})/(r_2 - r_1)$, and in at least some embodiments 0.005% $\Delta$/micron<TS<0.2% $\Delta$/micron. The inner cladding region 2 has an alpha value, $\alpha_T$, wherein $0.2 < \Delta_T < 5$.

Figure 2:
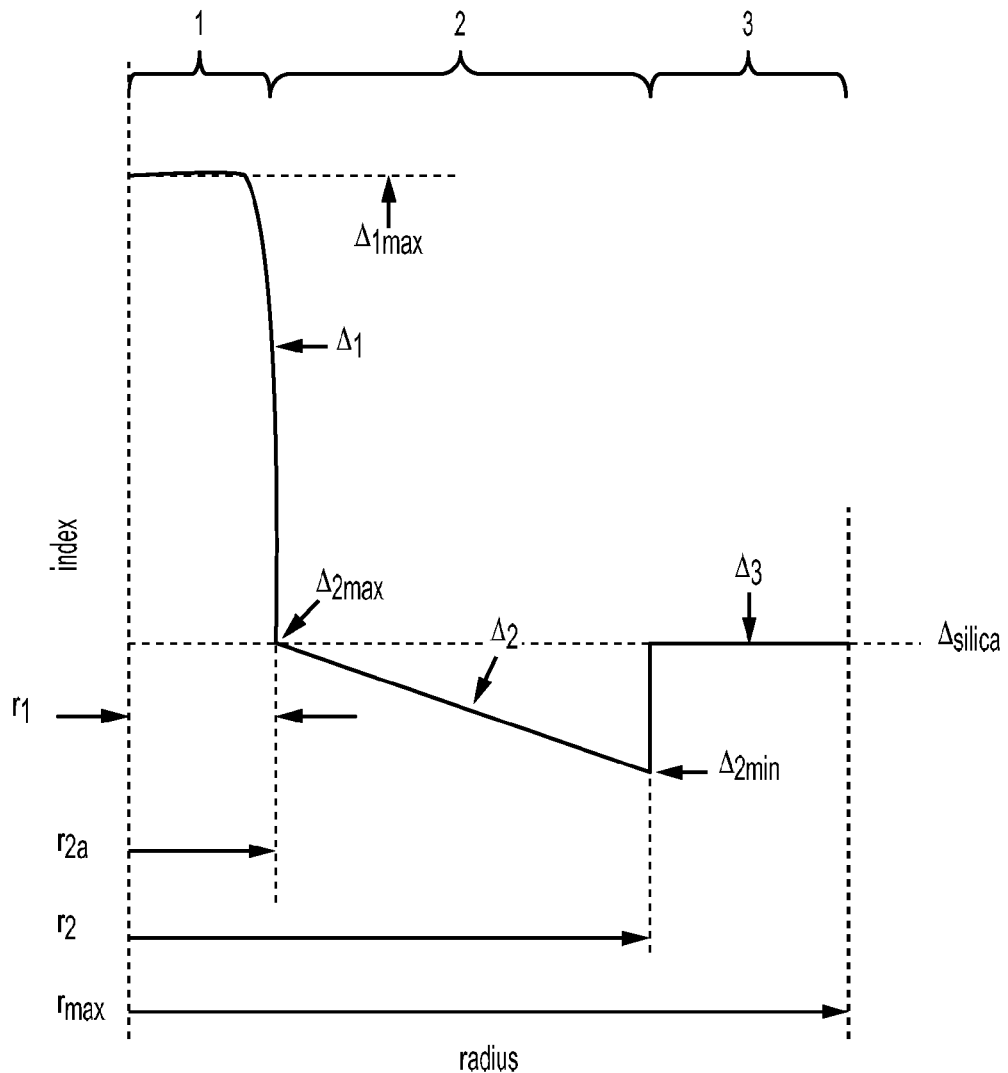
FIG. 2 shows an alternative refractive index profile corresponding to an embodiment of an optical fiber as disclosed herein.

As shown in FIG. 2 fiber, the index of refraction of the outer cladding region 3 is equal to that of undoped SiO$_2$, such as may be achieved by using undoped SiO$_2$ as the material for forming the outer cladding region 3. In fibers of FIGS. 1A, 1B, 1C and 3 the index of refraction of the outer cladding region 3 is less than that of undoped SiO$_2$, such as may be achieved by using fluorine doped SiO$_2$ as the material for forming the outer cladding region 3.

Figure 3:
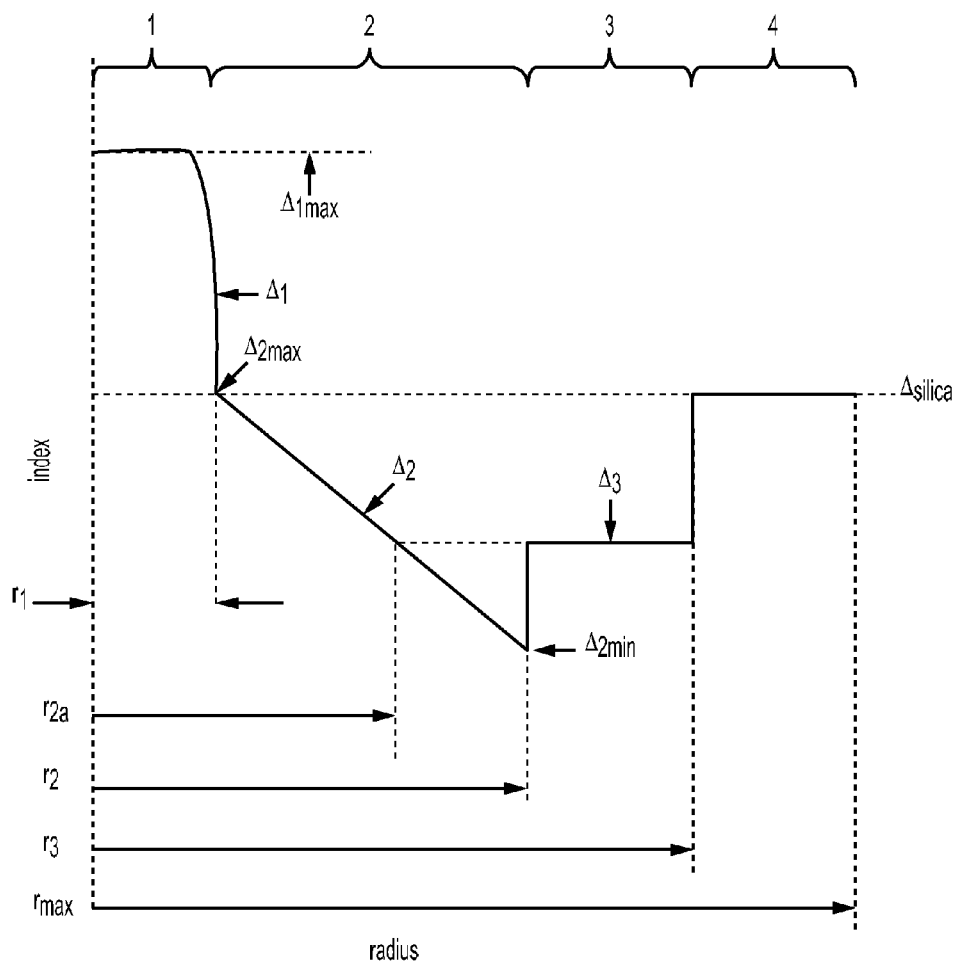
FIG. 3 shows another alternative refractive index profile corresponding to another embodiment of an optical fiber as disclosed herein.

In FIG. 3 fiber embodiment, outer cladding region 4 (second outer cladding) surrounds the outer cladding region 3. In this fiber embodiment, the index of refraction of the outer cladding region 4 is equal to that of undoped SiO$_2$ (in this embodiment, the outer cladding region 4 is also referred to herein as a silica outer layer). Alternatively, in some embodiments, the index of refraction of the outer cladding region 4 may be higher than that of undoped SiO$_2$, such as may be achieved by using SiON doped or chlorine doped SiO$_2$ as the material for forming the outer cladding region 4. Thus, as described above, the outer cladding region 4 may be comprised of SiO$_2$ or SiON.

In each of these embodiments, the inner cladding region 2 may exhibit a width w (w=$r_2 - r_1$) between of less than 15 microns, in some embodiments between 2 and 10 microns, and in some embodiments between about 3 to 10 microns (e.g., 3-8.5 microns). In the embodiments described herein each of these embodiments, the outer cladding region 3 exhibits a width $r_3 - r_2$ of at least 20 microns. In some embodiments, $r_3$ may be greater than 30, greater than 40 microns, greater than 45 microns, or greater than 50 microns and less or equal to than 65 microns. In some embodiments, $r_3$ may be greater than 30 microns and less than 50 microns (e.g., 35 microns$\leq r_3 \leq 45 \leq$microns, and $r_4$ greater than 45 microns, or greater than 50 microns, for example between 50 microns and less or equal to than 65 microns (e.g., 62.5 microns). Preferably, the higher index portion (compared to inner cladding region 2) of outer cladding region 3 extends at least to the point where the optical power which would be transmitted through the optical fiber is greater than or equal to 90% of the optical power transmitted, more preferably to the point where the optical power which would be transmitted through the optical fiber is greater than or equal to 95% of the optical power transmitted, and most preferably to the point where the optical power which would be transmitted through the optical fiber is greater than or equal to 98% of the optical power transmitted. In many embodiments, this is achieved by having the outer cladding region 3 extend at least to a radial point of about 30 microns. In some embodiments, outer cladding region 3 comprises chlorine (Cl) in an amount greater than 200 ppm when compared to that of the inner cladding region 2, for example greater than 400 or 700 or 1000 ppm or more, and in some embodiments preferably greater than 1500 ppm, and, in some embodiments, greater than 2000 ppm (0.2%) by weight (e.g., 2200 ppm, 2500 ppm, 3000 ppm, 4000 ppm, 5000 ppm, 6000 ppm, 10000 ppm, or there between).

Various embodiments will be further clarified by the following examples.

Table 1 below illustrates parameters for the modeled embodiments of exemplary fibers 1-4, 4a, and 5. The fiber embodiments 1-4, 4A and 5 depicted in Table 1 correspond to the fibers with the refractive index profiles of FIG. 1A. The fiber embodiment 4A corresponds to FIG. 1B. The fiber embodiments of examples 1-4, 4a, and 5 fibers disclosed in Table 1 have a chlorine doped silica based core 1, a silica based inner cladding region 2 that is doped with fluorine wherein the refractive index of the inner cladding decreases (becomes more negative) with radial position due to increase in fluorine concentration, and a fluorine doped outer cladding region 3 surrounding the inner cladding region 2. The outer cladding region 2 has the refractive index delta $\Delta_3$, such that $\Delta_{2min} < \Delta_3$. Optical fibers described herein can be manufactured by outside vapor deposition (OVD), vapor axial deposition (VAD), modified chemical vapor deposition (MCVD) and/or plasma vapor deposition (PCVD) processes.

TABLE 1

| Parameter | Ex 1 | Ex 2 | Ex 3 | Ex 4 | Ex 5 |
|---|---|---|---|---|---|
| Core Delta, $\Delta_{1max}$, % | 0.2 | 0.17 | 0.15 | 0.2 | 0.17 |
| Core dopant, wt % | Cl | Cl | Cl, | Cl | Cl |
| Chlorine wt % in core | 2 | 1.7 | 1.5 | 2 | 1.7 |
| Core Alpha | 100 | 100 | 100 | 100 | 100 |
| Core Radius, $r_1$, microns | 3.78 | 3.65 | 3.55 | 3.65 | 3.34 |
| $r_{2a}$, microns | 6.61 | 6.39 | 6.22 | 7.26 | 6.67 |
| Minimum Inner cladding Index, $\Delta_{2min}$, % | −0.20 | −0.24 | −0.27 | −0.19 | −0.23 |
| $\Delta_{2max}$, % | 0 | 0 | 0 | 0 | 0 |
| Inner Cladding dopant, max concentration, wt % | F, 0.65 | F, 0.77 | F, 0.86 | F, 0.62 | F, 0.74 |
| Inner Cladding Radius, $r_2$, microns | 7.55 | 7.3 | 7.1 | 8.3 | 7.6 |
| $r_2 - r_1$, microns | 3.77 | 3.65 | 3.55 | 4.65 | 4.26 |
| TS = $(\Delta_{2max} - \Delta_{2min})/(r_2 - r_1)$, %/micron | 0.053 | 0.066 | 0.076 | 0.041 | 0.054 |
| Inner Cladding alpha, $\alpha_T$ | 1 | 1 | 1 | 1 | 1 |
| Outer Cladding Index, $\Delta_3$, % | −0.15 | −0.18 | −0.20 | −0.15 | −0.18 |
| $\Delta_3 - \Delta_{2min}$, in % | 0.05 | 0.06 | 0.066 | 0.043 | 0.05 |
| Outer Cladding dopant, concentration, wt % | F, 0.48 | F, 0.58 | F, 0.65 | F, 0.48 | F, 0.58 |
| Outer Cladding Radius, $r_{max}$, microns | 62.5 | 62.5 | 62.5 | 62.5 | 62.5 |
| Attenuation at 1550 nm, dB/km | <0.17 | <0.17 | <0.17 | <0.17 | <0.17 |
| MFD at 1310 nm (microns) | 9.22 | 9.22 | 9.2 | 9.3 | 9.2 |
| Zero Dispersion Wavelength, nm | 1317 | 1318 | 1319 | 1321 | 1324 |
| Cable Cutoff (nm) | 1217 | 1211 | 1199 | 1228 | 1159 |
| Trench Volume, % Δ micron$^2$ | 6.6 | 7.0 | 7.6 | 6.6 | 10.5 |
| Bend loss at 1550 nm for 15 mm mandrel diameter, dB/turn | 1.34 | 1.43 | 1.57 | 1.34 | 2.23 |
| Bend loss at 1550 nm for 20 mm mandrel diameter, dB/turn | 0.27 | 0.29 | 0.32 | 0.22 | 0.48 |
| Bend loss at 1550 nm for 30 mm mandrel diameter, dB/turn | 0.004 | 0.005 | 0.005 | 0.004 | 0.008 |

Table 1 fiber embodiments are compatible with G.652/G.657 specifications, and having MFD at 1310 nm larger than 9 microns, zero dispersion wavelength, $\lambda_0$, of 1300 nm≤$\lambda_0$≤1324 nm, cable cutoff less than 1260 nm, bend loss at 1550 nm for 20 mm diameter mandrel of less than 0.5 dB/turn and bend loss at 1550 nm for 30 mm diameter mandrel of less than 0.01 dB/turn. The fiber embodiments of example 1-5 fibers have a chlorine doped silica based core 1, a silica based inner cladding region 2 that is doped with fluorine wherein the refractive index (and thus the refractive index delta) of the inner cladding decreases (becomes more negative) with radial position and an alpha profile of the inner clad, $\alpha_T$, of 1, the inner cladding has a Trench Slope TS=$(\Delta_{2max}-\Delta_{2min})/(r_2-r_1)$, of 0.005% Δ/micron<TS<0.2% Δ/micron, and a fluorine doped outer cladding region 3. These profiles have trench volumes of larger than 3% Δ micron$^2$ (i.e., $V_T$>3% Δmicron$^2$). More specifically, in Table 1 embodiments the exemplary fibers have 3% Δmicron$^2$<$V_T$≤12% Δmicron$^2$.

Table 2 below illustrates parameters for the modeled embodiments of exemplary fibers 6-9. The fiber embodiments of example 6-8 have the refractive index profile shown in FIG. 1. The fiber embodiments of example 6-8 fibers have a chlorine doped silica based core, a silica based inner cladding region that is doped with fluorine wherein the refractive index of the inner cladding decreases with radial position (i.e., becomes more negative due to increasing F concentration), and the silica based outer cladding region 3 of these fibers also comprises fluorine. The example 9 fiber embodiment has a refractive index profile shown in FIG. 2. The example 9 fiber embodiment has a chlorine doped core, an inner cladding region that is doped with fluorine wherein the refractive index of the inner cladding 2 decreases with radial position (i.e., becomes more negative) and the outer cladding region 3 that is essentially comprised of silica $SiO_2$ (i.e., the outer cladding region 3 of this embodiment is essentially pure silica and is free of any dopants).

These profiles have trench volumes of larger than 3% $\Delta micron^2$. More specifically, in Table 2 embodiments the exemplary fibers have 3% $\Delta micron^2 < V_T \leq 12\%$ $\Delta micron^2$.

Table 3 below illustrates parameters for the modeled embodiments of exemplary fibers 10-12.

TABLE 3

| Parameter | Ex 10 | Ex 11 | Ex 12 |
|---|---|---|---|
| Core Delta, $\Delta_{1max}$, % | 0.2 | 0.17 | 0.15 |
| Core dopant, wt. % | Cl | Cl | Cl |
| Chlorine wt % in core | 2 | 1.7 | 1.5 |
| Core Alpha | 100 | 100 | 100 |
| Core Radius, $r_1$, microns | 3.88 | 3.82 | 3.71 |
| $r_{2a}$, microns | 6.14 | 6.07 | 5.88 |
| Minimum Inner cladding | −0.21 | −0.25 | −0.28 |

TABLE 2

| Parameter | Ex 6 | Ex 7 | Ex 8 | Ex 9 |
|---|---|---|---|---|
| Core Delta, $\Delta_{1max}$, % | 0.2 | 0.17 | 0.15 | 0.34 |
| Core dopant, wt. % | Cl | Cl | Cl | Cl |
| Chlorine wt % in core | 2 | 1.7 | 1.5 | 3.4 |
| Core Alpha | 100 | 100 | 100 | 100 |
| Core Radius, $r_1$, microns | 3.88 | 3.82 | 3.71 | 4.37 |
| $r_{2a}$, microns | 6.14 | 6.07 | 5.88 | 4.37 |
| Minimum Inner cladding Index, $\Delta_{2min}$, % | −0.21 | −0.25 | −0.28 | −0.05 |
| $\Delta_{2max}$, % | 0 | 0 | 0 | 0 |
| Inner Cladding dopant, maximum wt. % | F, 0.68 | F, 0.81 | F, 0.90 | F, 0.16 |
| Inner Cladding Radius, $r_2$, microns | 7.05 | 6.95 | 6.75 | 13.1 |
| $r_2 - r_1$, microns | 3.17 | 3.13 | 3.04 | 8.73 |
| TS = $(\Delta_{2max} - \Delta_{2min})/(r_2 - r_1)$, %/micron | 0.066 | 0.08 | 0.092 | 0.006 |
| Inner Cladding alpha, $\alpha_T$ | 1 | 1 | 1 | 1 |
| Outer Cladding Index, $\Delta_3$, % | −0.15 | −0.18 | −0.2 | 0 |
| $\Delta_3 - \Delta_{2min}$, in % | 0.06 | 0.07 | 0.08 | 0.05 |
| Outer Cladding dopant | F | F | F | none |
| Outer Cladding Radius, $r_3$, microns | 62.5 | 62.5 | 62.5 | 62.5 |
| Attenuation at 1550 nm, dB/km | <0.17 | <0.17 | <0.17 | <0.17 |
| MFD at 1310 nm (microns) | 9.17 | 9.21 | 9.16 | 9.1 |
| Zero Dispersion Wavelength, nm | 1317 | 1315 | 1317 | 1309 |
| Cable Cutoff (nm) | 1219 | 1231 | 1211 | 1217 |
| Trench Volume, % $\Delta$ micron$^2$ | 6.2 | 6.0 | 6.6 | 5.0 |
| Bend loss at 1550 nm for 15 mm mandrel diameter, dB/turn | 1.25 | 1.19 | 1.34 | 1.03 |
| Bend loss at 1550 nm for 20 mm mandrel diameter, dB/turn | 0.25 | 0.24 | 0.27 | 0.21 |
| Bend loss at 1550 nm for 30 mm mandrel diameter, dB/turn | 0.0038 | 0.0036 | 0.0042 | 0.0037 |

Table 2 fiber embodiments are compatible with G.652/G.657 specifications, and having MFD at 1310 nm larger than 9 microns, zero dispersion wavelength, $\lambda_0$, of 1300 nm≤$\lambda_0$≤1324 nm, cable cutoff less than 1260 nm and bend loss at 1550 nm for 20 mm and 30 mm diameter mandrels of less than 0.5 dB/turn and less than 0.01 dB/turn, respectively. The fiber embodiments of example 6-9 fibers have a chlorine doped silica based core 1, a silica based inner cladding region 2 that is doped with fluorine wherein the refractive index of the inner cladding decreases (becomes more negative) with radial position and an alpha profile of the inner clad, $\alpha_T$, of 1 the inner cladding has a Trench Slope TS=$(\Delta_{2max}-\Delta_{2min})/(r_2-r_1)$, of 0.005% $\Delta$/micron<TS<0.2% $\Delta$/micron, and a fluorine doped outer cladding region 3.

TABLE 3-continued

| Parameter | Ex 10 | Ex 11 | Ex 12 |
|---|---|---|---|
| Index, $\Delta_{2min}$, % | | | |
| $\Delta_{2max}$, % | 0 | 0 | 0 |
| Inner Cladding dopant, wt. % | F, 0.68 | F, 0.81 | F, 0.90 |
| Inner Cladding Radius, $r_2$, microns | 7.05 | 6.95 | 6.75 |
| $r_2 - r_1$, microns | 3.17 | 3.13 | 3.04 |
| TS = $(\Delta_{2max} - \Delta_{2min})/(r_2 - r_1)$, %/micron | 0.066 | 0.08 | 0.092 |
| Inner Cladding alpha, $\alpha_T$ | 1 | 1 | 1 |
| First Outer Cladding Index, $\Delta_3$, % | −0.15 | −0.18 | −0.2 |
| $\Delta_3 - \Delta_{2min}$, in % | 0.06 | 0.07 | 0.08 |

TABLE 3-continued

| Parameter | Ex 10 | Ex 11 | Ex 12 |
|---|---|---|---|
| First Outer Cladding dopant | F | F | F |
| First Outer Cladding Radius, $r_3$, microns | 40 | 40 | 40 |
| Second Outer Cladding radius, $r_4$, microns | 62.5 | 62.5 | 62.5 |
| Second Outer Cladding dopant | none | none | none |
| Attenuation at 1550 nm, dB/km | <0.17 | <0.17 | <0.17 |
| MFD at 1310 nm (microns) | 9.17 | 9.21 | 9.16 |
| Zero Dispersion Wavelength, nm | 1317 | 1315 | 1317 |
| Cable Cutoff (nm) | 1219 | 1231 | 1211 |
| Trench Volume, % Δ micron$^2$ | 6.2 | 6.0 | 6.6 |
| Bend loss at 1550 nm for 15 mm mandrel diameter, dB/turn | 1.25 | 1.19 | 1.34 |
| Bend loss at 1550 nm for 20 mm mandrel diameter, dB/turn | 0.253 | 0.24 | 0.27 |
| Bend loss at 1550 nm for 30 mm mandrel diameter, dB/turn | 0.0038 | 0.0036 | 0.0042 |

Table 3 fiber embodiments are compatible with G.652/G.657 specifications, and having MFD at 1310 nm larger than 9 microns, zero dispersion wavelength, $\lambda_0$, of 1300 nm≤$\lambda_0$≤1324 nm, cable cutoff less than 1260 nm and bend loss at 1550 nm for 20 mm and 30 mm diameter mandrels of less than 0.5 dB/turn and less than 0.01 dB/turn, respectively. The fiber embodiments of example 10-12 fibers have a chlorine doped silica based core 1, a silica based inner cladding region 2 that is doped with fluorine wherein the refractive index of the inner cladding decreases (becomes more negative) with radial position and an alpha profile of the inner clad, $\alpha_T$, of 1, the inner cladding has a Trench Slope TS=$(\Delta_{2max}-\Delta_{2min})/(r_2-r_1)$, of 0.005% Δ/micron<TS<0.2% Δ/micron, a fluorine doped outer cladding region 3, and a second outer cladding of undoped silica surrounding the first outer cladding. These profiles have trench volumes of larger than 3% Δmicron$^2$. More specifically, in Table 3 embodiments the exemplary fibers have 3% Δmicron$^2$<$V_T$≤12% Δmicron$^2$. The second outer cladding of these exemplary embodiments is made essentially of pure silica.

Table 4 below illustrates parameters for the modeled embodiments of exemplary fibers 13-15. The fiber embodiment 13 corresponds to FIG. 1B. The fiber embodiments 14-15 corresponds to FIG. 1C.

TABLE 4

| Parameters | Ex 13 | Ex.14 | Ex.15 |
|---|---|---|---|
| Core Delta, $\Delta_{1max}$, % | 0.2 | 0.29 | 0.285 |
| Core dopant | Cl | Cl | Cl |
| Core wt % in core | 2 | 2.9 | 2.85 |
| Core Alpha | 100 | 100 | 100 |
| Core Radius, $r_1$, microns | 3.9 | 3.9 | 3.8 |
| $r_{2a}$, microns | 9.18 | 7.75 | 7.83 |
| Minimum Inner cladding Index, $\Delta_{2min}$, % | −0.21 | −0.2 | −0.3 |
| $\Delta_{2max}$, % | 0 | 0 | 0 |
| Inner Cladding dopant, max concentration, wt % | 0.680 | 0.650 | 0.980 |
| Inner Cladding Radius, $r_2$, microns | 17 | 11 | 10 |
| $r_2 - r_1$, microns | 13.1 | 7.1 | 6.2 |
| TS = $(\Delta_{2max} - \Delta_{2min})/(r_2 - r_1)$, %/micron | 0.016 | 0.028 | 0.048 |
| Inner Cladding alpha, $\alpha_T$ | 0.3 | 1.5 | 3 |
| Outer Cladding Index, $\Delta_3$, % | −0.16 | −0.08 | −0.08 |
| $\Delta_3 - \Delta_{2min}$, in % | 0.05 | 0.12 | 0.22 |
| Outer Cladding dopant, concentration, wt % | 0.52 | 0.26 | 0.26 |
| Outer Cladding Radius, $r_{max}$, microns | 62.5 | 62.5 | 62.5 |
| Attenuation at 1550 nm, dB/km | 0.17 | 0.17 | 0.17 |
| MFD at 1310 nm (microns) | 9.17 | 9.02 | 9.13 |
| Zero Dispersion Wavelength, nm | 1311.5 | 1311.7 | 1312.7 |
| Cable Cutoff (nm) | 1203 | 1194 | 1197 |
| Trench Volume, % Δ micron$^2$ | 6.12 | 3.65 | 3.77 |
| Bend loss at 1550 nm for 15 mm mandrel diameter, dB/turn | 1.41 | 1.317 | 2.34 |
| Bend loss at 1550 nm for 20 mm mandrel diameter, dB/turn | 0.195 | 0.268 | 0.243 |
| Bend loss at 1550 nm for 30 mm mandrel diameter, dB/turn | 0.0016 | 0.00195 | 0.0025 |

The fiber embodiments of example 10-12 fibers have a chlorine doped silica based core 1, a silica based inner cladding region 2 that is doped with fluorine wherein the refractive index of the inner cladding decreases (becomes more negative) with radial position, a fluorine doped outer cladding region 3 and an additional silica outer cladding region 4 (i.e., the second outer cladding) surrounding the outer cladding region 3. The refractive index profiles of these fiber embodiments are illustrated in FIG. 3. The fiber embodiments of example 13-15 fibers have a chlorine doped silica based core 1, a silica based inner cladding region 2 that is doped with fluorine wherein the refractive index of the inner cladding decreases (becomes more negative) with radial position and an alpha profile of the inner clad, $\alpha_T$, of 0.3<$\alpha_T$<1 for example 13, and 1<$\alpha_T$<5 for examples 14 and 15, the inner cladding has a Trench Slope TS=$(\Delta_{2max}-\Delta_{2min})/(r_2-r_1)$, of 0.005% Δ/micron<TS<0.2% Δ/micron, and a fluorine doped outer cladding region 3. The refractive index profiles of these fiber embodiments are illustrated in FIG. 3. Table 4 fiber embodiments are compatible with G.652/G.657 specifications, and having MFD at 1310 nm larger than 9 microns, zero dispersion wavelength, $\lambda_0$, of 1300 nm≤$\lambda_0$≤1324 nm, cable cutoff less than 1260 nm and bend loss at 1550 nm for 20 mm and 30 mm diameter mandrels of less than 0.5 dB/turn and less than 0.01 dB/turn, respectively. These profiles have trench volumes of larger than 3% Δmicron$^2$. More specifically, in Table 4 embodiments the exemplary fibers have 3% Δmicron$^2$<$V_T$≤12% Δmicron$^2$.

Table 5 below illustrates parameters for the modeled embodiments of exemplary fiber 16. The fiber embodiment 16 (Example 16 fiber) corresponds to FIGS. 4 and 5.

TABLE 5

| Parameters | EX.16 |
|---|---|
| Core Delta, $\Delta_{1max}$, % | 0.34 |
| Core dopant | Cl |
| Core wt % in core | 3.4 |
| Core Alpha | 100 |
| Core Radius, $r_1$, microns | 4.5 |

TABLE 5-continued

| Parameters | EX.16 |
|---|---|
| $r_{2a}$, microns | 12 |
| Minimum Inner cladding Index, $\Delta_{2min}$, % | −0.1 |
| $\Delta_{2max}$, % | 0 |
| Inner Cladding dopant, max concentration, wt % | 0.325 |
| Inner Cladding Radius, $r_2$, microns | 16 |
| $r_{2a} - r_1$, microns | 7.5 |
| TS = $(\Delta_{2max} - \Delta_{2min})/(r_2 - r_{2a})$, %/micron | 0.013 |
| Inner Cladding alpha, $\alpha_T$ | 1 |
| Outer Cladding Index, $\Delta_3$, % | 0 |
| $\Delta_3 - \Delta_{2min}$, in % | 0.1 |
| Outer Cladding dopant, concentration, wt % | 0 |
| Outer Cladding Radius, $r_{max}$, microns | 62.5 |
| Attenuation at 1550 nm, dB/km | ≤0.17 |
| MFD at 1310 nm (microns) | 9.2 |
| Zero Dispersion Wavelength, nm | 1310 |
| Cable Cutoff (nm) | 1200 |
| Trench Volume, % Δ micron$^2$ | 5.83 |
| Bend loss at 1550 nm for 15 mm mandrel diameter, dB/turn | 1.42 |
| Bend loss at 1550 nm for 20 mm mandrel diameter, dB/turn | 0.216 |
| Bend loss at 1550 nm for 30 mm mandrel diameter, dB/turn | 0.005 |

The fiber embodiment of Example 16 fiber has a chlorine doped silica based core 1, a silica based inner cladding region 2 having a first portion that comprises undoped silica and a second region that is doped with fluorine wherein the refractive index of the inner cladding decreases (becomes more negative) with radial position (that is, the inner cladding region that decreases (becomes more negative) with radial position is offset from the core), and an silica outer cladding region 3 surrounding the inner cladding region 2. The refractive index profiles of this fiber embodiment is illustrated in FIG. 5. The fiber embodiment of example 16 fiber has a trench alpha (also referred to herein as the Inner Cladding alpha or inner clad alpha) $\alpha_T$ of 1, and in some embodiments, $\alpha_T$, 0.3<$\alpha_T$<5, the inner cladding has a Trench Slope TS=$(\Delta_{2max}-\Delta_{2min})/(r_2-r_{2a})$, of 0.005% Δ/micron<TS<0.2% Δ/micron. The inner cladding region that decreases (becomes more negative) with radial position is offset 1 micron≤offset≤15 microns, more specifically, the offset is 2 micron≤offset≤12 microns, more specifically, the offset is 3 micron≤offset≤10 microns. Table 5 fiber embodiments are compatible with G.652/G.657 specifications, and having MFD at 1310 nm larger than 9 microns, zero dispersion wavelength, $\lambda_0$, of 1300 nm≤$\lambda_0$≤1324 nm, cable cutoff less than 1260 nm and bend loss at 1550 nm for 20 mm and 30 mm diameter mandrels of less than 0.5 dB/turn and less than 0.01 dB/turn, respectively. These profiles have trench volumes of larger than 3% Δmicron$^2$. More specifically, in Table 5 embodiments the exemplary fibers have 3% Δmicron$^2$<$V_T$≤12% Δmicron$^2$.

The fiber embodiments 1-16 have reduced attenuation because of the high amount of Cl presence, because Cl has a lower Rayleigh scattering loss vs. other dopants such as $GeO_2$ or $TiO_2$. The exemplary fiber embodiments disclosed herein also have a high alpha core (core alpha, α≥10). The exemplary optical fiber embodiments disclosed herein do not have an additional inner cladding region situated between the core 1 and the inner cladding region 2 (the cladding region that has a refractive index that becomes more negative with the increasing radial distance). That is, in this embodiments, the inner cladding region 2 is directly adjacent to and is in contact with the core 1. This helps the fiber to achieve good bending performance, achieving other performance requirements, and while making the fiber easily less costly to manufacture. Furthermore, the embodiments disclosed herein have low Rayleigh scattering due to lower Ge concentration and viscosity matching between core 1 and inner-cladding region 2. The outer cladding region 3 has higher refractive index with respect to inner cladding region 2, which helps to minimize Macrobending losses. The absolute difference between the average refractive index delta of the outer-cladding region 3 and the minimum refractive index delta inner cladding region 2 (i.e., |Δ2 min−Δ3|) is greater than 0.005% Δ, more preferably greater than 0.015% Δ, and even more preferably greater than 0.025% Δ.

Advantageously, the fiber designs disclosed herein provide a core with equal or lower viscosity than the cladding. This results in reduced stresses within the fiber and correspondingly reduced fiber attenuation, not only because of reduction in the viscosity mismatch but also reduction in the CTE (coefficient of thermal expansion) mismatch.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising:
   (i) a chlorine doped silica based core comprising a core alpha $(\alpha_{core})$>10, a maximum refractive index delta $\Delta_{1max}$ %, and Cl concentration >1 wt %;
   (ii) a cladding surrounding the core, the cladding comprising:
      a. an inner cladding region comprising fluorine doped silica, adjacent to and in contact with the core and having a refractive index delta $\Delta_2$ and a minimum refractive index delta $\Delta_{2min}$ such that $\Delta_{2min}$<$\Delta_{1max}$, the refractive index delta $\Delta_2$ of the inner cladding region comprising a region that decreases with radial position, and
      b. an outer cladding region surrounding the inner cladding region and having refractive index delta $\Delta_3$, such that $\Delta_{2min}$<$\Delta_3$;
   wherein the optical fiber has mode field diameter MFD at 1310 nm of ≥9 microns, a cable cutoff of ≤1260 nm, zero dispersion wavelength such that 1300 nm≤zero dispersion wavelength ≤1324 nm, and bend loss at 1550 nm for a 20 mm mandrel of less than 0.5 dB/turn.

2. The optical fiber according to claim 1, wherein the core alpha is at least 20.

3. The optical fiber according to claim 1, wherein the core alpha is at least 50.

4. The optical fiber according to claim 1, wherein the core alpha is at least 100.

5. The optical fiber according to claim 1 wherein the refractive index delta $\Delta_2$ of the inner cladding region monotonically decreases radially, towards the outer cladding region.

6. The optical fiber according to claim 1 wherein the core has an outer radius $r_1$ and 3.0 micron≤$r_1$≤6.0 micron.

7. The optical fiber according to claim 1, wherein 3.3 micron≤$r_1$≤4.5 micron.

8. The optical fiber according to claim 1, wherein inner cladding region has a maximum refractive index delta $\Delta_{2max}$, and wherein $\Delta_3$ is <$\Delta_{2max}$.

9. The optical fiber according to claim 1, wherein the the inner cladding has a Trench Slope TS=($\Delta_{2max}-\Delta_{2min}$)/($r_2-r_1$), of 0.005% $\Delta$/micron<TS<0.2% $\Delta$/micron.

10. The optical fiber according to claim 1, wherein the inner cladding has an alpha value $\alpha_T$, and 0.2<$\Delta_T$<5.

11. The optical fiber of claim 1, wherein the core has chlorine concentration of greater than 1.2 wt %.

12. The optical fiber of claim 1, wherein the core has chlorine concentration of greater than 3 wt %.

13. The optical fiber of claim 1, wherein the outer cladding region is surrounded by a silica outer layer.

14. The optical fiber of claim 1, wherein $\Delta_{1max}$ is between 0.1% and 0.5%.

15. The optical fiber of claim 1, wherein $\Delta_{2min}$ is between −0.35% and 0.05%.

16. The optical fiber of claim 1, wherein $\Delta_3$ is between −0.3% and 0.1%.

17. The optical fiber of claim 1, wherein the attenuation at 1550 nm is less than 0.17 dB/km.

18. The optical fiber of claim 1, wherein the core has a radius $r_1$ such that 3 micron≤$r_1$≤4.5 micron; and 0.1%≤$\Delta_{1max}$≤0.35%; the inner cladding region has an outer radius $r_2$ and 6 micron≤$r_2$≤18 micron; −0.35%≤$\Delta_{2min}$<0.0%.

19. The optical fiber of claim 18, wherein the inner cladding region has a volume between 3% $\Delta$micron$^2$ and 12% $\Delta$micron$^2$.

20. The optical fiber of claim 18, wherein the bend loss at 1550 nm for a 20 mm mandrel is less than 0.3 dB/turn.

21. The optical fiber of claim 18, wherein MFD at 1310 nm is between 9 microns and 9.6 microns.

22. The optical fiber according to claim 1, wherein the refractive index delta $\Delta_2$ of the portion of the inner cladding region that decreases with radial position is offset from the core.

23. The optical fiber according to claim 1, wherein the offset is 1 micron≤offset≤15 microns.

* * * * *

UNITED STATES PATENT AND TRADEMARK OFFICE
CERTIFICATE OF CORRECTION

PATENT NO. : 10,094,975 B2
APPLICATION NO. : 15/659955
DATED : October 9, 2018
INVENTOR(S) : Dana Craig Bookbinder et al.

Page 1 of 1

It is certified that error appears in the above-identified patent and that said Letters Patent is hereby corrected as shown below:

In the Claims

In Column 17, Line 16, Claim 9, delete "the the" and insert -- the --, therefor.

In Column 17, Line 20, Claim 10, delete "$0.2<\Delta_T<5$." and insert -- $0.2<\alpha_T<5$. --, therefor.

Signed and Sealed this
Fourth Day of October, 2022

Katherine Kelly Vidal
*Director of the United States Patent and Trademark Office*